(12) United States Patent
Brück et al.

(10) Patent No.: US 6,571,458 B2
(45) Date of Patent: Jun. 3, 2003

(54) APPARATUS FOR PRODUCING A HONEYCOMB BODY

(75) Inventors: Rolf Brück, Bergisch Gladbach (DE); Robert Diewald, Siegburg (DE)

(73) Assignee: Emitec Gesellschaft fur Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/771,452

(22) Filed: Jan. 26, 2001

(65) Prior Publication Data
US 2001/0009064 A1 Jul. 26, 2001

Related U.S. Application Data

(62) Division of application No. 09/369,717, filed on Aug. 6, 1999, now Pat. No. 6,226,867, which is a continuation of application No. PCT/EP98/00476, filed on Jan. 29, 1998.

(30) Foreign Application Priority Data

Feb. 6, 1997 (DE) .......................... 197 04 521

(51) Int. Cl.⁷ .................. B23P 19/00; B21D 51/16; B21C 47/00; B01D 50/00
(52) U.S. Cl. .................. 29/700; 29/890; 422/180; 72/146
(58) Field of Search ................ 29/700, 890, 505, 29/428, 890.08; 422/180; 72/146, 148, 147; 502/439; 242/444

(56) References Cited

U.S. PATENT DOCUMENTS

| | | |
|---|---|---|
| 3,849,076 A | 11/1974 | Gryaznov |
| 4,719,680 A | 1/1988 | Cyron |
| 4,847,230 A | 7/1989 | Cyron |
| 4,923,109 A | 5/1990 | Cyron |
| 5,157,556 A * | 10/1992 | Hugenell ............ 359/849 |
| 5,328,774 A | 7/1994 | Brück et al. |
| 5,446,006 A | 8/1995 | Domesle et al. |
| 5,464,679 A | 11/1995 | Maus et al. |
| 5,468,455 A | 11/1995 | Brück |
| 5,474,746 A | 12/1995 | Maus et al. |
| 5,525,309 A | 6/1996 | Breuer et al. |
| 5,608,968 A | 3/1997 | Maus et al. |

FOREIGN PATENT DOCUMENTS

| | | |
|---|---|---|
| DE | 195 21 685 A1 | 12/1996 |
| DE | 195 22 327 A1 | 1/1997 |

* cited by examiner

Primary Examiner—I Cuda Rosenbaum
Assistant Examiner—John C. Hong
(74) Attorney, Agent, or Firm—Laurence A. Greenbe; Werner H. Stemer; Gregory L. Mayback

(57) ABSTRACT

An apparatus for producing a honeycomb body from a stack having a plurality of at least partially structured sheet metal layers forming a plurality of channels through which a fluid can pass, including a mould having an internal shape substantially corresponding to an external shape of a honeycomb body to be produced, a wrapping device for holding a stack at least partially structured sheet metal layers at a central region thereof, the wrapping device being pivotally disposed about an axis for wrapping the stack, and a holding device having positioning elements at least partially insertable into channels formed in the central region of the stack for maintaining a structural configuration in the central region of the stack during a wrapping of the stack.

3 Claims, 2 Drawing Sheets

APPARATUS FOR PRODUCING A HONEYCOMB BODY

CROSS-REFERENCE TO RELATED APPLICATION

This application is a division of U.S. application Ser. No. 09/369,717, filed Aug. 6, 1999, now U.S. Pat. No. 6,226,867, which was a continuation of International Application No. PCT/EP98/00476, filed Jan. 29, 1998, which designated the United States.

BACKGROUND OF THE INVENTION

Field of the Invention

The invention concerns an apparatus for producing a honeycomb body, in particular a catalytic converter carrier body, having at least one stack of a plurality of at least partially structured metal sheets.

Carrier bodies for catalytic converters which provide for a reduction in the amount of pollutants in exhaust gases, in particular exhaust gases of an engine, can be in the form of a metallic honeycomb body. Such honeycomb bodies include a stack having a plurality of at least partially structured metal sheets. U.S. Pat. No. 4,923,109 describes a honeycomb body which has a stack of at least partially structured metal sheets, the stack being wrapped or twisted in opposite directions around itself and around a central region.

Published German Patent Application DE 195 21 685 A1 discloses a method for producing such a honeycomb body. In accordance with that method it is proposed that initially a stack is formed from a plurality of at least partially structured sheet metal layers. The stack is thereafter introduced into an open mould formed from mould segments corresponding to the outside shape of the honeycomb body to be produced, and the stack is held by a wrapping device in a central region. Thereupon the stack is wound or wrapped around in a direction of rotation and the mould is closed by pivoting the mould segments in the opposite direction to the direction of rotation of the wrapping device when a predetermined degree of wrapping is attained.

German Patent DE 195 22 327 discloses a method for producing a honeycomb body having a plurality of channels through which a fluid can flow. The honeycomb body has a plurality of at least partially structured sheet metal layers. This method is suitable in particular for producing a honeycomb body as is known from International Patent Application WO 90/03220. Such a honeycomb body has at least three stacks of metal sheets. At least three of the stacks are folded around a respective associated bend line in the central region of the honeycomb body and twisted in the folded condition in the same direction around each other and around the central region with the bend lines. Production of such a honeycomb body is effected in accordance with Published German Patent Application DE 195 22 327 A1 by virtue of each stack being folded about a respective bend line. The stacks when folded in that way are introduced into a mould. Each stack is held by a wrapping or twisting device in a central region. The wrapping or twisting device has winding bars which engage into the bent stack in the region of each bend line. The individual stacks are twisted in the same direction by rotation of the winding bars about a central axis.

International Patent Application WO 94/01661 discloses a honeycomb body which is made up of only a small number of metal sheets. The structure of the honeycomb body is suitable for at least one elongate electrical conductor to be integrated into at least one of the sheet metal layers or for one of the sheet metal layers itself to be in the form of an elongate insulated electrical conductor. For the production of such a metallic honeycomb body consisting of at least partially structured sheet metal layers, WO 94/01661 proposes that a hollow cone is produced from a small number of at least partially structured sheet metal strips. That hollow cone or circular ring is deformed from the outside inwardly at least at three lines so that a corresponding number of reversal lines are formed both in an outer region of the ring and also in an inner region thereof. The resulting star-like or rosette-like structure, which has loop configurations, is twisted by same-directional, rotational twisting of the loop configurations, which extend between the inner reversal lines and the outer reversal lines, about the inner reversal lines.

It has been found that defects, which adversely affect the quality of the honeycomb body, occur in some regions in the macrostructure of the finished honeycomb body. Such defects occur in an irregular fashion when successively producing a plurality of honeycomb bodies, which are manufactured using the same apparatuses. This requires particular measures in the quality control of the honeycomb bodies produced.

SUMMARY OF THE INVENTION

It is accordingly an object of the invention to provide an apparatus for producing a honeycomb body which overcomes the above-mentioned disadvantages of the heretofore-known methods of this general type and which improves the quality of the honeycomb body produced. A further object of the invention is to provide a method for producing a plurality of honeycomb bodies that simplifies quality assurance.

With the foregoing and other objects in view there is provided, in accordance with the invention, a method for producing a honeycomb body having a plurality of at least partially structured sheet metal layers and formed with a plurality of channels through which a fluid can pass. The method comprises the following steps:

a) forming a stack with a plurality of at least partially structured sheet metal layers defining channels and with a central region, the channels defining a longitudinal direction;

b) introducing the stack into a mould;

c) holding the stack in the mould with a wrapping device and with positioning elements reaching at least partially into the channels in the central region of the stack, the wrapping device being pivotable around a winding axis and having at least two winding bars located essentially parallel to the winding axis and extending along the longitudinal direction of the channels, the at least two winding bars engaging the stack at a respective exterior surface at the central region of the stack; and d) wrapping the stack until a predetermined degree of wrapping of the stack is attained, while maintaining, in the central region of the stack, a structural configuration of structures disposed relative to one another and formed by the at least partially structured-sheet metal layers.

With the objects of the invention in view there is also provided a method for producing honeycomb bodies, each having a plurality of at least partially structured sheet metal layers and each formed with a plurality of channels through which a fluid can pass. The method which comprises the following steps:

a) forming a stack with a plurality of at least partially structured sheet metal layers defining channels and with a central region, the channels defining a longitudinal direction;

b) introducing the stack into a mould;

c) holding the stack in the mould with a wrapping device and with positioning elements reaching at least partially into the channels, in the central region of the stack, the wrapping device being pivotable around a winding axis and having at least two winding bars located essentially parallel to the winding axis and extending along the longitudinal direction of the channels, the at least two winding bars engaging the stack at a respective exterior surface at the central region of the stack; and d) wrapping the stack until a predetermined degree of wrapping of the stack is attained for producing a honeycomb body;

e) removing the stack in its wrapped condition from the mould; and f) repeating steps a) to e) with further stacks for producing further honeycomb bodies, the stack and each of the further stacks formed with the same structural configuration in the respective central region, the structural configuration having structures disposed relative to one another and formed by the at least partially structured sheet metal layers, and maintaining, during the wrapping step, the structural configuration of the at least partially structured sheet metal layers of each of the stacks.

In accordance with another mode of the invention, the structural configuration in the central region of the stack for the honeycomb body is determined after the step of forming the stack, and the further stacks are formed such that the structural configuration in the central region of the stack is repeated by layering further pluralities of at least partially structured sheet metal layers for the further honeycomb bodies, if the honeycomb body produced from the stack satisfies predetermined quality criteria.

With the objects of the invention in view there is further provided an apparatus for producing a honeycomb body from a stack having a plurality of at least partially structured sheet metal layers forming a plurality of channels through which a fluid can pass, comprising:

a mould having an internal shape substantially corresponding to an external shape of a honeycomb body to be produced;

a wrapping device for holding a stack at least partially structured sheet metal layers at a central region thereof, the wrapping device being pivotally disposed about an axis for wrapping the stack; and a holding device having positioning elements at least partially insertable into channels formed in the central region of the stack for maintaining a structural configuration in the central region of the stack during a wrapping of the stack.

In accordance with the invention, a method is provided for producing a honeycomb body having a plurality of channels through which a fluid can flow. The honeycomb body comprises a plurality of at least partially structured metal sheets or sheet metal layers. According to the method, at least one stack is formed from a plurality of at least partially structured metal sheets. The stack is introduced into a mould and is held therein by a wrapping device rotatable about an axis in the central region of the stack. The stack, which has been introduced into the mould, is then subjected to a wrapping procedure until the stack has reached a predetermined degree of wrapping. At least during the wrapping procedure a structural configuration formed in a central region with structures of the metal sheets, which are disposed relative to one another, is maintained. The method thus ensures that no relative movement of the structures occurs in a central region of the stack, whereby it is possible to produce honeycomb bodies which are of consistent quality. Maintaining the structural configuration with structures of the metal sheets, which are disposed relative to each other, in the central region of the stack, is preferably effected as from formation of the structural configuration in the central region. In the case of honeycomb bodies known for example from Published German Patent Application DE 195 21 685 A1, the structural configuration is preferably maintained for the further steps in the method, with the termination of the operation of forming the stack of metal sheets. In the case of honeycomb bodies in which the stack is bent about a bend line, the macrostructure of the stack in the central region, that is to say in the region of the bend line, is considered as the structural configuration.

The structural configuration is preferably predetermined or designated in the central region of a stack. It is also possible to determine, on the basis of empirical investigations, a structural configuration in the central region of a stack, which results in honeycomb bodies which are particularly advantageous in terms of their quality.

It has already been stated above that honeycomb bodies may have defects in their macrostructure. Those defects involve deformation of channel walls which are formed by the at least partially structured metal sheets or sheet metal layers. Such deformations adjoin in particular regions in which the honeycomb body has a relatively stiff structure. To avoid deformation of the channel walls in the region of such stiff structures, it is proposed that a stack is layered alternately from structured metal sheets, which have corrugation crests and troughs, and smooth metal sheets, wherein the layering of the stack is effected in such a way that a corrugation crest of a structured metal sheet is disposed substantially between two corrugation troughs of an adjacent structured metal sheet. Such a stack involves a relatively low level of stiffness. Relative displacement of the structures of adjacent metal sheets occurs due to the operation of wrapping the stack or stacks. As a result, the cross-section of the honeycomb body has regions which can have a higher level of stiffness than the central region.

Those stiffer regions however are not so pronounced or stiff that in adjacent areas of those regions the assembly suffers from deformation of the structures which form the channel walls. Forming a stack with a relatively soft central region is particularly suitable for the production of honeycomb bodies of a small diameter or a small degree of wrapping.

To avoid relatively stiff regions in the cross-section of the honeycomb body it is sufficient if the structural configuration in the central region of a stack is relatively soft. It is also possible to construct a stack in such a way that the stiffness of the stack does not change in a direction transverse with respect to the longitudinal direction of the structures. For that purpose it is proposed that the structured metal sheets have corrugation crests and troughs which are repeated with a constant corrugation or wave length. With such a configuration of the structured sheets, it is proposed that the metal sheets, prior to the stacking operation, are severed from a metal sheet strip, wherein the sheets are of a length which corresponds to an integral multiple of the corrugation length.

That operation of cutting the metal sheets to length provides that, when the structured metal sheets are put into a layered assembly to form a stack, a corrugation crest of a structured metal sheet is disposed substantially between two corrugation troughs of an adjacent structured sheet.

As an alternative to a stack having a structural configuration in the central region which is of a low level of stiffness, it is proposed that the structural configuration in the central region of the stack has a relatively high level of stiffness. A relatively high level of stiffness of the structural configuration in the central region of the stack is achieved with the structured metal sheets with corrugation crests and troughs and the smooth metal sheets being configured in an alternately layered layer assembly, such that that corrugation crests and troughs of adjacent structured metal sheets are aligned in a direction substantially perpendicular with respect to the longitudinal direction along which the corrugation crests or troughs, respectively, extend. If the structured metal sheets are such that the corrugation crests and troughs have a repeating corrugation or wave length, the layering array produces a stack which has a relatively high level of stiffness. The operation of wrapping around the stack causes relative displacement of the corrugation crests and troughs of the adjacent metal sheets. As a result, the corrugation crests are no longer disposed in alignment with respect to the corrugation troughs of adjacent metal sheets. Thus the finished honeycomb body has, outside the central region, as viewed in the radial direction, a structure with a lower level of stiffness than the central region. The central region of the finished honeycomb body can be considered as a relatively hard core and the region outside the core can be considered as a relatively soft shell. This mode of the invention allows producing a honeycomb body in which the formation of pronounced regions with a high level of strength in the shell is avoided.

If structured sheets which have corrugation crests and troughs that are repeated with a corrugation or wave length $\lambda$ are used to form the honeycomb body, it is proposed that the sheets, prior to the stacking operation, are severed from a sheet metal strip in a length corresponding to the relationship $L=n\lambda+0.5\lambda$ wherein n is an element from the group of natural numbers. That ensures that in the operation of stacking the structured metal sheets corrugation crests and troughs of adjacent structured metal sheets are substantially aligned with each other.

In the production of a honeycomb body the length of the structured metal sheets cannot always be freely selected because the finished honeycomb body, as a catalytic converter carrier body, must have certain geometrical properties, for example a given number of channels in its cross-section. To form a defined structural configuration in the central region of the stack it is therefore proposed that positioning elements are introduced into the channels in the central region after forming a stack. A suitable form and configuration of the positioning elements with respect to each other makes it possible to produce a structural configuration in the central region of the stack, which has a relatively low or a relatively high level of stiffness. It is also possible to achieve suitable levels of stiffness of the stack in the central region, by suitably adapting the positioning elements to the required structural configuration of the central region.

In accordance with another mode of the invention, a method for producing honeycomb bodies with an improved quality is proposed, wherein each honeycomb body has a plurality of channels made of a plurality of at least partially structured metal sheets through which channels a fluid can flow.

In accordance with this method for the production of honeycomb bodies it is proposed that at least one stack is formed from a plurality of at least partially structured metal sheets. The layered stack is introduced into a mould and held therein by a wrapping device rotatable about an axis in the central region of the stack. The stack is subjected to a wrapping procedure until a predetermined degree of wrapping of the stack is achieved. The stack when wrapped in that way is removed from the mould, possibly after a fixing operation, for example through the us a tubular casing.

Those method steps are repeated for each stack of a further honeycomb body. Each stack is formed with a structural configuration which is always the same in a central region. The structural configuration has structures of the metal sheets, which structures are disposed relative to one another. That structural configuration is maintained at least during the wrapping procedure for each stack. The fact that the structural configuration of the structures of the metal sheets, which are disposed relative to each other, in the central region of the stack is the same in the case of each honeycomb body ensures that the distribution of the channels over the cross-section of the honeycomb body is almost the same in a plurality of honeycomb bodies. Preferably the structural configuration in the central region of a stack is predetermined for a first honeycomb body of a plurality of honeycomb bodies. The predetermined structural configuration in the central region is preferably so selected that within the cross-section of the honeycomb body there are no pronounced regions with a high level of stiffness generated, in the proximity of which deformed structures are formed.

A further mode of the invention provides that a stack for a first honeycomb body of a plurality of honeycomb bodies is formed in a layered configuration and the structural configuration in the central region of the stack is determined for the first honeycomb body. That structural configuration of the first stack in the central region is repeated by suitably layering metal sheets to form stacks for each further honeycomb body if the honeycomb body produced from the first stack satisfies predetermined quality criteria.

With the objects of the invention in view there is further provided an apparatus for producing at least one honeycomb body, in particular a catalytic converter honeycomb body, made from at least one stack having a plurality of at least partially structured metal sheets which form a plurality of channels through which a fluid can flow. The apparatus includes a mould, the internal configuration of which substantially corresponds to an external shape of a honeycomb body to be produced. The apparatus also includes a wrapping device by which each stack is held in its central region at least during a wrapping procedure. The wrapping device has a holding device by which each stack is held in the central region of the stack in such a way that a structural configuration produced in a central region with structures of the metal sheets, which are disposed relative to one another, is maintained at least during the wrapping procedure.

Advantageously the holding device has positioning elements which can be at least partially introduced into the channels of the structural configuration in a central region of each stack. The configuration of the positioning elements substantially corresponds to the shape of the channels. The positioning elements are preferably bar-shaped or have the shape of a mandrel. The width of the holding device is preferably such that it corresponds to the thickness of a stack.

Other features which are considered as characteristic for the invention are set forth in the appended claims.

Although the invention is illustrated and described herein as embodied in an apparatus for producing a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
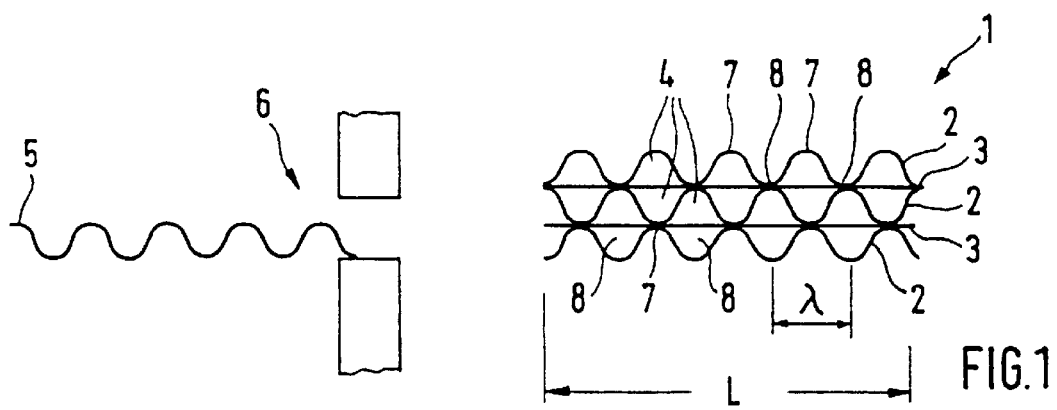
FIG. 1 is a diagrammatic illustration of a procedure for forming a first embodiment of a stack.

Referring now to the figures of the drawings in detail and first, particularly, to FIG. 1 thereof, there is illustrated a procedure for forming a stack 1. The stack 1 includes a plurality of at least partially structured metal sheets 2. Smooth metal sheets 3 are disposed between the structured metal sheets 2 which are stacked on top of each other.

Channels 4 are formed in the stack 1 by the structured sheets 2 and the smooth sheets 3. The individual structured sheets 2 are cut off a sheet metal strip 5 at a suitable length by a cutting device 6.

The structured sheets 2 have corrugation crests 7 and corrugation troughs 8. The structured sheets 2 are disposed in a layered relationship alternately in such a way that corrugation crests 7 and corrugation troughs 8 of adjacent structured sheets are substantially aligned with each other.

The structured sheets 2 have corrugation crests 7 and corrugation troughs 8 which are repeated with a corrugation length or wave length $\lambda$. Prior to the stacking operation the sheets 2 are severed from a sheet metal strip 5 at a length L corresponding to the relationship $L=n\lambda+0.5\lambda$, wherein n is an element from the group of natural numbers. Due to this form and configuration the stack has a relatively high level of stiffness.

Figure 2:
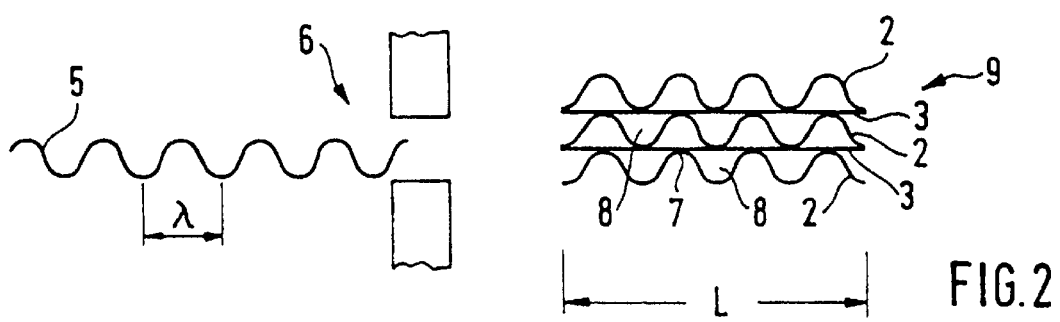
FIG. 2 is a diagrammatic illustration of a procedure for forming a second embodiment of a stack.

FIG. 2 shows a further possible layer configuration of structured metal sheets 2 and smooth metal sheets 3. The stack 9 shown in FIG. 2 has a configuration of structured sheets 2 and smooth sheets 3 in which the corrugation crests 7 of a structured sheet 2 are disposed between two corrugation troughs 8 of an adjacent structured sheet 2. The structured sheets 2 have a corrugation crest and trough structure which is repeated with a corrugation or wave length $\lambda$. The structured sheets 2 are severed or cut prior to the stacking operation from a sheet metal strip 5, such that the structured sheets 2 have a length L which corresponds to an integral multiple of the length $\lambda$.

The stack 9 has a lower level of stiffness than the stack 1 because the corrugation crests 7 of a structured sheet 2 are so positioned that they are always between two corrugation troughs 8 of an adjacent structured sheet 2.

Figure 3:
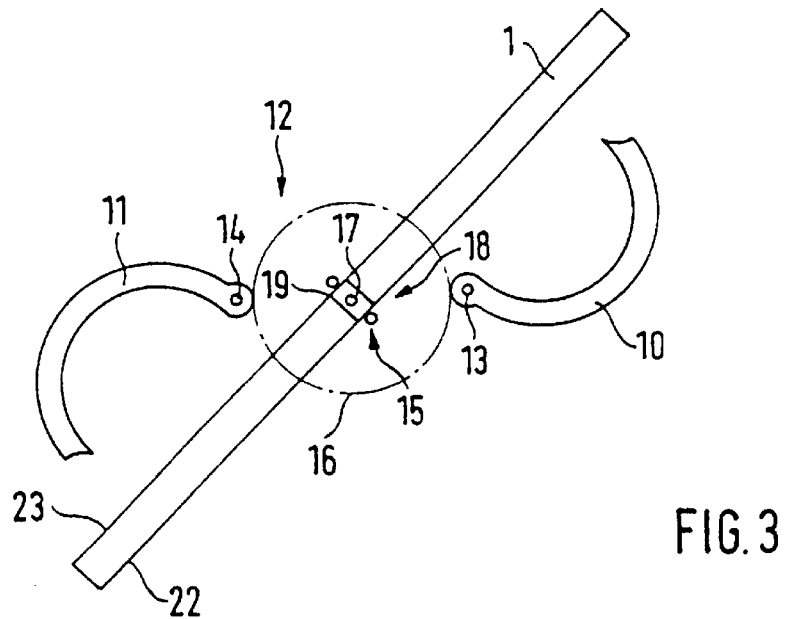
FIG. 3 is a diagrammatic plan view of an embodiment of an apparatus according to the invention with a stack.

FIG. 3 shows an apparatus for producing a honeycomb body. FIG. 3 is an exemplary illustration of an apparatus for producing a honeycomb body. Such an apparatus is known from Published German Patent Application DE 195 21 685 A1. The apparatus has a mould 12 comprising two mould segments 10, 11. Each mould segment 10, 11 is pivotable about a respective pivot axis 13, 14. In the pivoted state of the mould segments 10, 11 they enclose a honeycomb body formed by a wrapping device 15. The envelope of the honeycomb body is identified by reference numeral 16.

The wrapping device 15 is pivotable about a central axis 17. The wrapping device 15 holds the stack 1 together in a central region 18.

Figure 4:
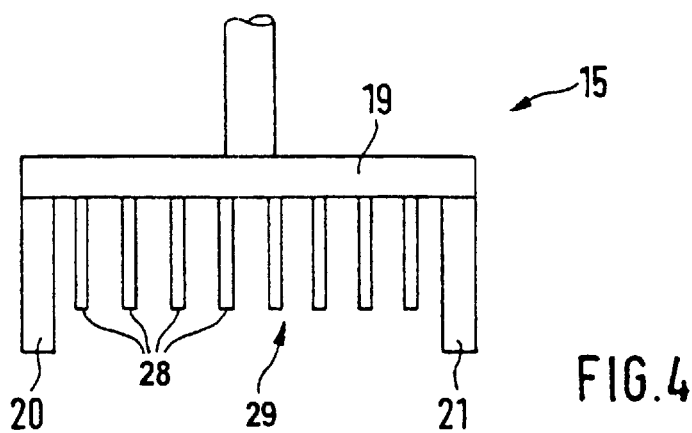
FIG. 4 is a side elevational view of a first embodiment of a wrapping device.

FIG. 4 diagrammatically illustrates the wrapping device 15. The wrapping device 15 has a carrier 19. Disposed at each end of the carrier 19 is a respective winding mandrel or bar 20 and 21 respectively which each engage a respective outside surface 22, 23 of the stack 1. Disposed between the winding bars 20, 21 are positioning elements, 28 which extend substantially parallel to the winding bars 20, 21. The positioning elements 28 are formed substantially like a bar and they at least partially engage into the channels 4 of the stack 1, whereby the structural configuration of the stack in the central region 18 is maintained. The wrapping device 15 may have a plurality of rows of positioning elements 28. They may also be provided in staggered relationship relative to each other. The configuration of the positioning elements 28 substantially depends on the desired structural configuration in the central region 18 of a stack. The positioning elements 28 and the carrier 19 form a holding device 29 by which each stack 1 is held in the central region 18 thereof in such a way that, at least during the wrapping procedure, a structural configuration provided in the central region 18, having structures which are disposed relative to each other, in particular corrugation crests 7 and corrugation troughs 8, of the structured sheets 2, is maintained.

Figure 5:
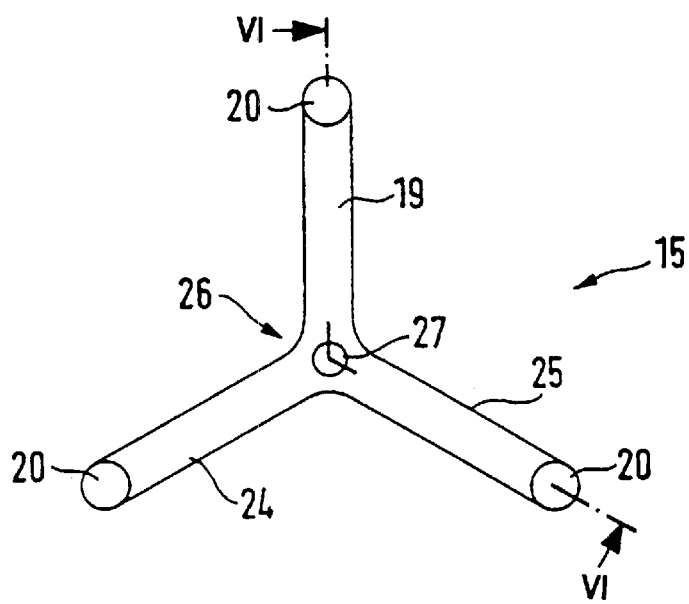
FIG. 5 is a bottom view of a second embodiment of a wrapping device.
Figure 6:
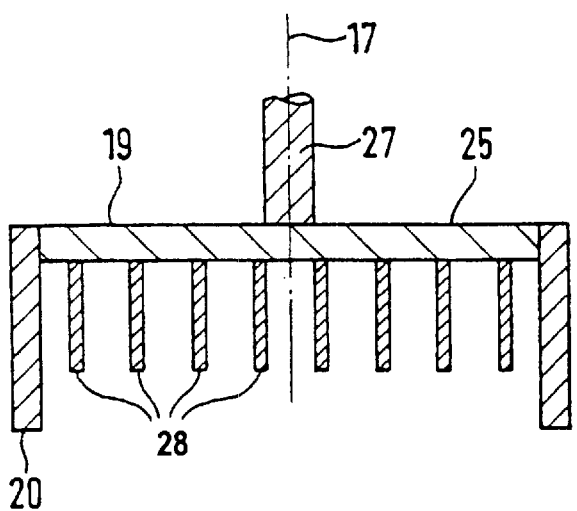
FIG. 6 is a cross-sectional view along the line VI—VI of the wrapping device shown in FIG. 5.

FIGS. 5 and 6 show a further embodiment of a wrapping device 15. The wrapping device 15 is intended in particular for producing a honeycomb body having a plurality of channels through which a fluid can flow. The honeycomb body comprises a plurality of at least partially structured metal sheets, wherein a plurality of stacks is formed in a layered configuration from a plurality of at least partially structured metal sheets 2, with each stack being folded about a respective bend line. The stacks are introduced into an open mould, which is formed from mould segments corresponding to the external shape of the honeycomb body to be produced, and held in the mould by the wrapping device 15. The stacks, which are not shown, are twisted or wound around each other in one direction of rotation. The production of such a honeycomb body is described for example in Published German Patent Applications DE 195 22 327 A1 and DE 195 21 685 A1. The content of those publications is incorporated by reference and deemed to be content of the present patent application.

The wrapping device 15, as is illustrated in FIG. 5, has three carriers 19, 24, 25 which extend away from a common center 26. Provided at the center 26 is a drive shaft 27 by which the wrapping device 15 is pivotable about the axis 17. Each carrier 19, 24, 25 is formed in the same manner. An angle of about 120° is formed between each carrier 19, 24, 25. Provided at the free ends of each of the carriers 19, 24, 25 are respective winding bars 20 which can be brought into engagement with the stack or stacks. The winding bars 20 engage substantially into the region of the bend line of a stack. Rotating the winding bars 20 about the axis 17 in one direction causes the individual stacks, which are not shown, to be twisted or wrapped in the same direction. In order to ensure that the structural configuration or structure of the stack in the central region is maintained at least during the wrapping procedure, each carrier 19, 24, 25 has positioning elements 28 which can be at least partially introduced into channels 4 in each stack. It is not necessary to have the same configuration of the positioning elements 28 on each carrier 19, 24, 25 of the holding device 29. It is also possible to provide different configurations of the positioning elements 28.

We claim:

1. Apparatus for producing a honeycomb body from a stack having a plurality of at least partially structured sheet metal layers forming a plurality of channels through which a fluid can pass, comprising:

a mould having an internal shape substantially corresponding to an external shape of a honeycomb body to be produced;

a wrapping device for holding a stack of at least partially structured sheet metal layers at a central region thereof, said wrapping device being pivotally disposed about an axis for wrapping the stack; and a holding device having positioning elements at least partially inserted into channels formed in the central region of the stack for maintaining a structural configuration in the central region of the stack during a wrapping of the stack.

2. The apparatus according to claim 1, wherein said internal shape of said mould corresponds to an external shape of a catalytic converter carrier body.

3. The apparatus according to claim 1, wherein said positioning elements are mandrel-shaped positioning elements.

* * * * *